UNITED STATES PATENT OFFICE.

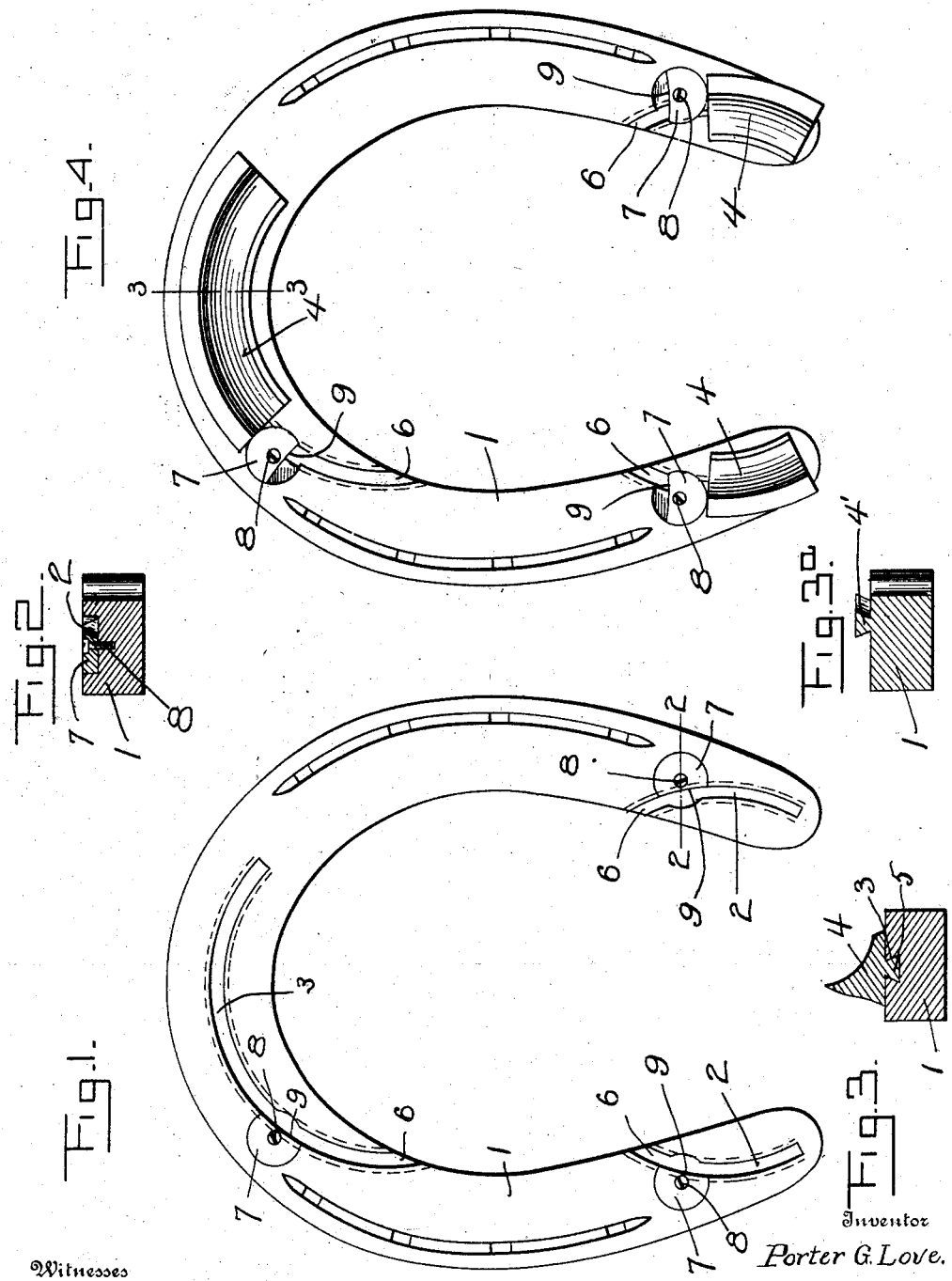

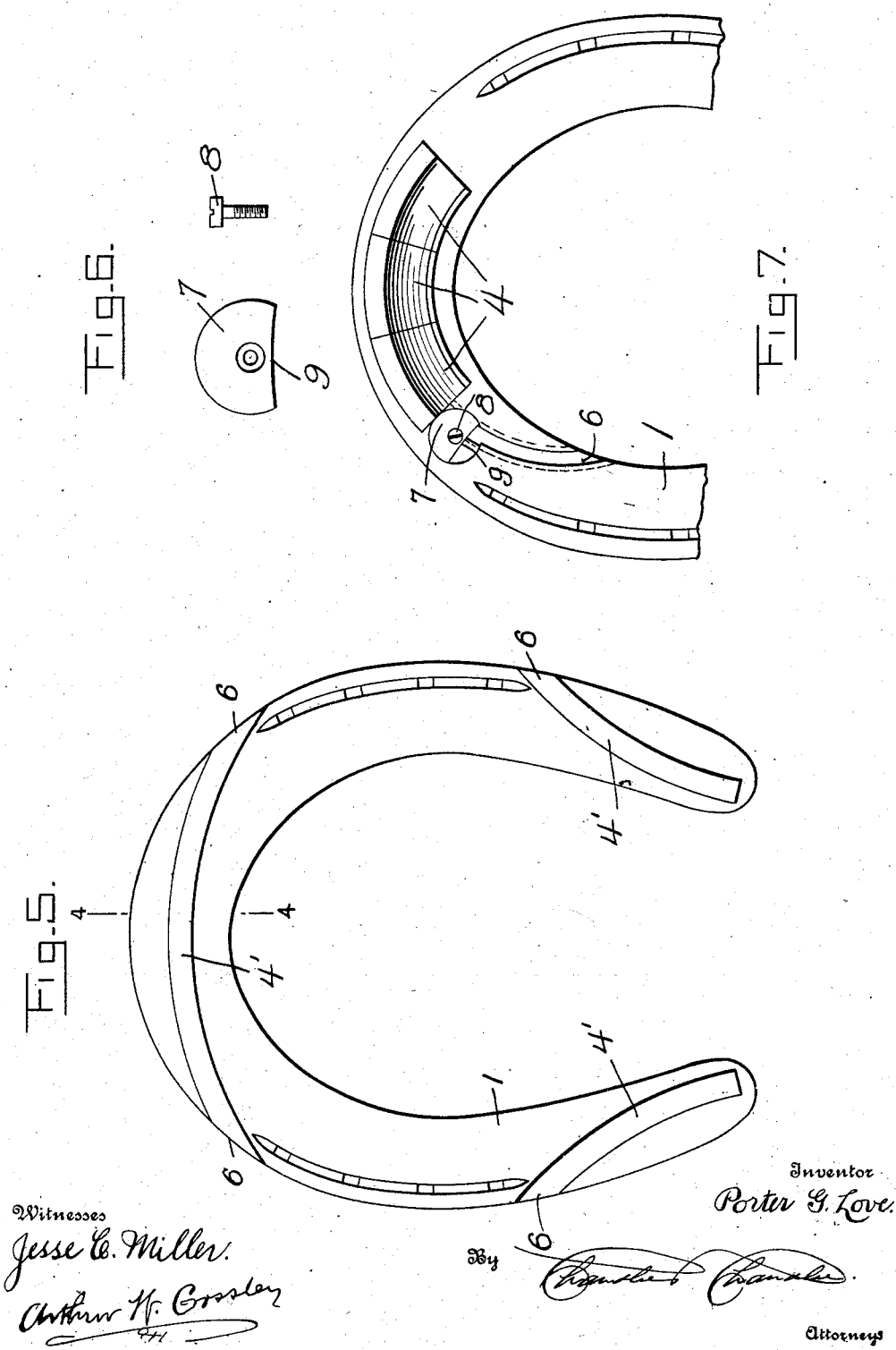

PORTER G. LOVE, OF DENVER, COLORADO.

HORSESHOE.

No. 878,886.    Specification of Letters Patent.    Patented Feb. 11, 1908.

Application filed April 11, 1907. Serial No. 367,626.

*To all whom it may concern:*

Be it known that I, PORTER G. LOVE, a citizen of the United States, residing at Denver, in the county of Arapahoe, State of Colorado, have invented certain new and useful Improvements in Horseshoes; and I do hereby declare the following to be a full, clear, and exact description of the invention, such as will enable others skilled in the art to which it appertains to make and use the same.

This invention has relation to that class of horseshoes that are provided with removable calks.

It is the object of the invention to provide a shoe of the kind mentioned in or on which the removable calks may be secured in such manner that the stress or strain put thereon by the animal shod with the shoe will not tend to displace the calk, so that it can be more easily retained in place than is common with horse or ox shoes of the same type or class as now commonly made.

The nature of the invention is ascertainable from the device portrayed in the annexed drawings, forming a part of this specification, in view of which it will first be described in detail with respect to its construction and mode of use, and then be particularly pointed out in the subjoined claims.

Of the said drawings—Figure 1 is a bottom view of a plate or shoe, designed to be nailed upon the hoof of a horse and adapted to have my removable calks applied thereto. Fig. 2 is a transverse section of the plate or shoe in the plane 2 2, of Fig. 1. Fig. 3 is a section in the plane 3—3, Fig. 4. Fig. 3ª is a section on the line 4—4 of Fig. 5. Fig. 4 is a bottom view with the calks applied. Fig. 5 is a bottom view of a shoe showing a variation of the form shown in Fig. 1. Fig. 6 is respectively a plan and side view of the washer and screw-rivet. Fig. 7 shows a toe-calk applied made up of sections.

Similar numerals of reference designate similar parts or features, as the case may be, wherever they occur.

In carrying out my invention I provide a shoe or plate, 1, of usual form in outline, provided with the usual nail-holes to adapt it to be nailed upon a horse's hoof. Undercut or dovetail grooves 2 are formed in the heels of the shoe on a circle eccentric to but in the same plane with the circle or curve of the shoe, and at the toe point I form a similar groove 3 eccentric to but in the same plane with the curve of the shoe at that place.

Into the grooves 2 and 3 formed as stated, I fit calks 4 having dovetail tongues or ribs 5 formed on their bases, suited to be moved in the grooves aforesaid. The toe-calks may be made in one piece or in sections—that is, instead of making the toe-calk in one piece, it may be made up in short pieces as of two or more heel-calks 4. (See Fig. 7.)

One or both ends of the undercut grooves described may be left open, as at 6, so that the dovetail tongues 5 may enter the grooves and be moved into place therein.

After the calks have been moved into place in the grooves, they may be held therein against being moved out of the groove by closing the open end or ends of the grooves by a washer 7 secured to the plate by a screw-rivet, 8, extended through its center and tapped into the shoe 1. The washer has one side cut away on a curve 9 so that by loosening the screw-rivet 8, when it is desired to remove the calk, the washer can be turned around with the curved cut-away side 9 concentric with the groove and thus allow the calk to be moved out of the groove. Of course, the washer will be arranged in position with respect to the said grooves so as to have them hold the calks in desired place, and permit the latter when the washers are loosened to be moved into or out of the grooves.

In all instances the grooves 2 and 3 will be formed on circular lines decidedly eccentric to but in the same plane with the circular outline of the shoe, which, in general, conforms to the outline of the bottom of the hoof of a horse. I have found that the twisting or torsional stress put upon a shoe by a horse is, in general, in the direction of the outline of the outside of the shoe, and hence if the calks are secured in grooves formed on the lines of the stress put thereon they will tend to move out of the grooves, and beside, they will not perform the functions required of them so well as though such stress were in a plane transversely or diagonally to the plane of the calk and its holding-groove.

It would make no difference, so far as my invention extends, whether the dovetail groove were formed in the shoe and the rib on the calk, or the reverse order of the said features were observed. The latter construction is shown in Figs. 3ª and 5, where the shoe is provided with ribs 4' and the calks have a coöperating groove. So also, the formation of the grooves 2 and 3 in the shoe, instead of being on a circle of less degree than the circle described by the outline of the shoe, may be formed on a circle of greater degree as indicated by the ribs 4' 4', in Fig. 5. In the latter figure of the drawing it has been thought unnecessary to show more than an indication of the lines on which the ribs and grooves are formed, in order to give a clear understanding of the invention.

In all of the several forms it is to be observed that my invention comprehends a shoe-plate adapted to be nailed on the hoof of a horse, provided with calk-holding grooves or lugs formed on circles eccentric to but in the same plane with the outline of the shoe, with detachable calks having dovetail grooves or ribs, as the case may require, suiting them to be connected with the shoe-plate described, and washers secured on the shoe-plate to close the open ends of the grooves to hold the latter in place, the said washers being cut away on one side on a circular line concentric with the circular form of the groove in the shoe-plate.

The calks may be made sharp or dull as circumstances may suggest, and when composed of sections the outer ends may be of different form if need be.

Of course the object of making the calks removable is to enable them to be renewed when necessary without removing the shoe or shoe-plate.

As before stated the eccentric form of the calks with respect to the form of the shoes is to secure an arrangement whereby the stress put upon the calks by the animal will be in a plane transversely or at an angle, at least, to the line of the faces of the calks and their tongue-and-groove connection with the shoe.

What is claimed is—

1. A horseshoe provided with removable calks, having a dovetail tongue-and-groove connection with the shoe, said tongues and grooves being formed on circular lines eccentric to but in the same plane with the circular outline of the shoe, and means to maintain the calks in the grooves.

2. A horseshoe provided with removable calks, having a dovetail tongue-and-groove connection with the shoe, said tongues and grooves being formed on circular lines eccentric to the circular outline of the shoe, and washers and screw-rivets to secure the washers to the shoe against the ends of the calks to hold them in place on the shoe, said washers being cut away on one side on a circular line concentric with the line of the tongue-and-groove connection of the calk with the shoe.

In testimony whereof, I affix my signature, in presence of two witnesses.

PORTER G. LOVE.

Witnesses:
 HENRY A. LINSTROTH,
 D. F. COWELL.